US011239532B2

United States Patent
Shi et al.

(10) Patent No.: US 11,239,532 B2
(45) Date of Patent: Feb. 1, 2022

(54) BATTERY SEPARATORS AND RELATED METHODS

(71) Applicant: Celgard, LLC, Charlotte, NC (US)

(72) Inventors: Lie Shi, Matthews, NC (US); Christopher L. Cowger, Charlotte, NC (US); Heba K. Botros, Waxhaw, NC (US)

(73) Assignee: Celgard, LLC, Charlotte, NC (US)

( * ) Notice: Subject to any disclaimer, the term of this patent is extended or adjusted under 35 U.S.C. 154(b) by 181 days.

(21) Appl. No.: 15/238,850

(22) Filed: Aug. 17, 2016

(65) Prior Publication Data

US 2017/0062785 A1    Mar. 2, 2017

Related U.S. Application Data

(60) Provisional application No. 62/205,805, filed on Aug. 17, 2015.

(51) Int. Cl.
*H01M 50/449* (2021.01)
*B32B 3/26* (2006.01)
(Continued)

(52) U.S. Cl.
CPC ............ *H01M 50/449* (2021.01); *B32B 3/26* (2013.01); *B32B 5/022* (2013.01); *B32B 5/08* (2013.01); *B32B 7/04* (2013.01); *B32B 27/12* (2013.01); *B32B 27/205* (2013.01); *B32B 27/302* (2013.01); *B32B 27/304* (2013.01); *B32B 27/308* (2013.01); *B32B 27/32* (2013.01); *B32B 27/40* (2013.01); *H01M 50/403* (2021.01); *H01M 50/411* (2021.01); *H01M 50/44* (2021.01); *B32B 2250/24* (2013.01); *B32B 2255/02* (2013.01); *B32B 2255/26* (2013.01); *B32B 2260/021* (2013.01); *B32B 2260/046* (2013.01); *B32B 2262/02* (2013.01);
(Continued)

(58) Field of Classification Search
CPC .......... H01M 2/18; H01M 2/14; H01M 2/145; H01M 2/16; H01M 2/1653; H01M 2/1666; H01M 2/162; H01M 10/0525; H01M 50/449; H01M 50/403; B32B 3/26; B32B 5/02; B32B 5/022; B32B 27/12
See application file for complete search history.

(56) References Cited

U.S. PATENT DOCUMENTS 6,432,586 B1    8/2002   Zhang
6,881,515 B2 *  4/2005   Wensley ............... H01M 2/16
                                                          429/129
(Continued)

FOREIGN PATENT DOCUMENTS

JP    05151949 A  *  6/1993  .......... H01M 2/1666
JP    H05151949       6/1993

*Primary Examiner* — Karie O'Neill Apicella
(74) *Attorney, Agent, or Firm* — Hammer & Associates P.C.

(57) ABSTRACT

Battery separators and methods are disclosed. The battery separator may be used in a lithium battery. The separator may include a microporous membrane laminated to a coated nonwoven. The coating may contain a polymer and optionally, a filler or particles. The methods may include the steps of: unwinding the microporous membrane and the nonwoven, laminating the nonwoven and microporous membrane, and coating the nonwoven before or after lamination.

8 Claims, 5 Drawing Sheets

(51) Int. Cl.
*B32B 5/02* (2006.01)
*B32B 27/12* (2006.01)
*H01M 50/403* (2021.01)
*B32B 27/30* (2006.01)
*B32B 27/40* (2006.01)
*B32B 5/08* (2006.01)
*B32B 27/20* (2006.01)
*B32B 27/32* (2006.01)
*B32B 7/04* (2019.01)
*H01M 50/44* (2021.01)
*H01M 50/411* (2021.01)
*H01M 10/052* (2010.01)

(52) U.S. Cl.
CPC ............... *B32B 2262/0238* (2013.01); *B32B 2262/0253* (2013.01); *B32B 2262/0261* (2013.01); *B32B 2262/0269* (2013.01); *B32B 2262/0276* (2013.01); *B32B 2262/0284* (2013.01); *B32B 2262/12* (2013.01); *B32B 2262/14* (2013.01); *B32B 2264/102* (2013.01); *B32B 2264/104* (2013.01); *B32B 2264/12* (2013.01); *B32B 2274/00* (2013.01); *B32B 2307/206* (2013.01); *B32B 2307/732* (2013.01); *B32B 2457/10* (2013.01); *H01M 10/052* (2013.01)

(56) References Cited

U.S. PATENT DOCUMENTS

| | | | |
|---|---|---|---|
| 7,087,343 | B2 | 8/2006 | Shi et al. |
| 7,112,389 | B1 | 9/2006 | Arora et al. |
| 2001/0008965 | A1 | 7/2001 | Kinn et al. |
| 2005/0014063 | A1* | 1/2005 | Shi ............... H01M 2/145 429/144 |
| 2010/0159334 | A1* | 6/2010 | Kashima ......... H01M 2/162 429/231.95 |
| 2013/0115837 | A1 | 5/2013 | Kitchen et al. |
| 2013/0224631 | A1* | 8/2013 | Gronwald ........ H01G 11/52 429/509 |
| 2014/0045033 | A1 | 2/2014 | Zhang et al. |
| 2014/0272569 | A1 | 9/2014 | Cai et al. |
| 2015/0280195 | A1* | 10/2015 | Schmitz ......... C08K 5/098 429/145 |
| 2015/0303003 | A1* | 10/2015 | Ha ............... H01M 2/145 429/400 |

* cited by examiner

BATTERY SEPARATORS AND RELATED METHODS

CROSS REFERENCE TO RELATED APPLICATIONS

This application claims priority to and the benefit of U.S. provisional patent application Ser. No. 62/205,805 filed Aug. 17, 2015, hereby fully incorporated by reference herein.

FIELD OF THE INVENTION

At least selected embodiments of the present disclosure or invention are directed to new, improved or optimized separators, composites, batteries including same, and/or related methods. In at least one embodiment, a battery separator includes a microporous membrane having a nonwoven laminated thereon. The inventive battery separator can also include a microporous membrane without having a nonwoven laminated thereon. The battery separators may be used in a lithium battery or cell, a lithium ion battery, or a lithium secondary battery, battery pack, module, system, device, vehicle, and/or the like. In accordance with at least certain embodiments, the present disclosure or invention is directed to novel or improved battery separators, laminated separators, composite separators, coated laminated separators, coated composite separators, lithium battery separators, and/or methods of making such separators, and/or methods of using such separators or batteries including such separators. In accordance with at least certain selected embodiments, the present disclosure or invention is directed to novel or improved lithium battery separators including a microporous membrane laminated to a coated nonwoven, and the coating may contain a polymer and optionally, a filler or particles, and/or to methods including the steps of: unwinding the microporous membrane and the nonwoven, laminating the nonwoven and microporous membrane, and coating the nonwoven before or after lamination.

BACKGROUND

Battery separators are generally known. Battery separators for lithium batteries are also generally known.

A lithium battery typically includes an anode, a cathode, a separator between the anode and cathode, an electrolyte in ionic communication between the anode and the cathode (e.g., the electrolyte may, in some cases, flow through and reside in the separator), and a container housing the foregoing components.

The separator is a critical component of the battery. The separator, among other things, keeps the anode and cathode from coming into contact (e.g., from an external force exerted on or through the container and from dendrite growth between the electrodes). The separator provides electrical insulation. Any contact between the electrodes allows electrons to be transferred directly between the electrodes, which may result in an electrical short circuit. The separator is typically microporous and provides a pathway for ions in the electrolyte to flow from one electrode to the other during the charge and discharge cycles of a battery, such as a lithium battery. The separator may play a critical role in the safety and performance of the battery.

As the demand for better batteries increases, the separator will be one component where battery performance enhancement may be obtained.

U.S. Pat. No. 6,881,515, incorporated herein by reference, discloses a separator for a polymer battery having a microporous membrane coated, on both sides, with a gel-forming polymer and plasticizer. The gel-forming polymer may be polyvinylidene fluoride (PVDF) and its copolymers.

U.S. Pat. No. 7,087,343, incorporated herein by reference, discloses a battery separator for a lithium battery having a shutdown microporous membrane adhesively bonded to a high melt integrity nonwoven.

There is still a need for new or improved battery separators that will improve the performance and safety of at least certain batteries, such as, at least certain lithium batteries.

SUMMARY OF THE INVENTION

At least selected embodiments of the present disclosure or invention may address the above needs, issues or concerns, and/or may provide and/or are directed to new, improved or optimized separators, composites, laminates, batteries including same, and/or related methods. In at least one embodiment, a battery separator includes a microporous membrane having a nonwoven laminated thereon. The inventive battery separator can also include a microporous membrane without having a nonwoven laminated thereon. The battery separators may be used in a lithium battery or cell, a lithium ion battery, or a lithium secondary battery, battery pack, module, system, device, vehicle, and/or the like.

In accordance with at least certain embodiments, the present disclosure or invention is directed to novel or improved battery separators, laminated separators, composite separators, coated laminated separators, coated composite separators, lithium battery separators, and/or methods of making such separators, and/or methods of using such separators or batteries including such separators. In accordance with at least certain selected embodiments, the present disclosure or invention is directed to novel or improved lithium battery separators including a microporous membrane laminated to a coated nonwoven, and the coating may contain a polymer and optionally, a filler or particles, and/or to methods including the steps of: unwinding the microporous membrane and the nonwoven, laminating the nonwoven and microporous membrane, and coating the nonwoven before or after lamination.

At least selected embodiments of the present invention are directed to new, improved or optimized separators, composites, batteries including same, and/or related methods. In one embodiment, a battery separator includes a microporous membrane having a nonwoven laminated thereon. The inventive battery separator can also include a microporous membrane without having a nonwoven laminated thereon. The battery separators may be used in a lithium battery or cell, a lithium ion battery, or a lithium secondary battery, battery pack, module, system, device, vehicle, or the like. In accordance with at least selected embodiments, the present disclosure or invention is directed to novel or improved battery separators, laminated separators, composite separators, coated laminated separators, coated composite separators, lithium battery separators, and/or methods of making such separators, and/or methods of using such separators or batteries including such separators. In accordance with at least certain embodiments, the present disclosure or invention is directed to novel or improved lithium battery separators including a microporous membrane laminated to a coated nonwoven, the coating may contain a polymer and optionally, a filler or particles, and/or to methods including the steps of: unwinding the microporous membrane and the nonwoven, laminating the nonwoven and microporous membrane, and coating the nonwoven before or after lamination.

In accordance with at least possibly preferred embodiments, aspects or objects, the inventive separator may result in an improved battery separator by, among other things, improving the puncture strength, reducing splittiness (e.g., increase cross machine strength), improving high temperature melt integrity, improving tensile strengths (in both the machine and cross machine directions), and/or having a shutdown function.

DESCRIPTION OF THE DRAWINGS

For the purpose of illustrating at least certain exemplary embodiments or aspects of the invention, there is shown in the drawings a form that is presently preferred; it being understood, however, that this invention is not limited to the precise arrangements and instrumentalities shown.

DETAILED DISCUSSION OF THE INVENTION

Figure 1:
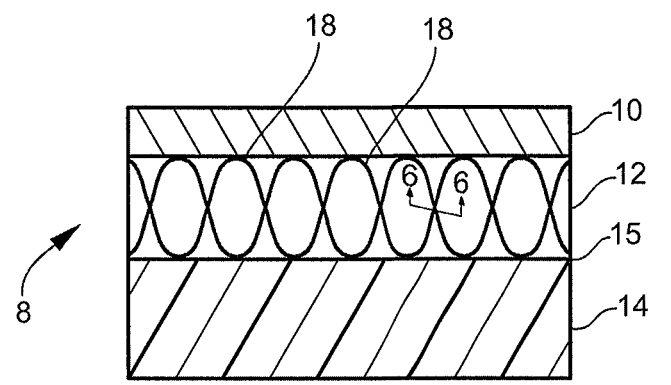
FIG. 1 is a schematic illustration of a cross-section of an embodiment of the instant invention, which is a one sided lamination of components (nonwoven and membrane).

At least selected embodiments of the present disclosure or invention are directed to new, improved or optimized separators, composites, batteries including same, and/or related methods. In at least one embodiment, a battery separator includes a microporous membrane having a nonwoven laminated thereon. The inventive battery separator can also include a microporous membrane without having a nonwoven laminated thereon. The battery separators may be used in a lithium battery or cell, a lithium ion battery, or a lithium secondary battery, battery pack, module, system, device, vehicle, and/or the like. In accordance with at least certain embodiments, the present disclosure or invention is directed to novel or improved battery separators, laminated separators, composite separators, coated laminated separators, coated composite separators, lithium battery separators, and/or methods of making such separators, and/or methods of using such separators or batteries including such separators. In accordance with at least certain selected embodiments, the present disclosure or invention is directed to novel or improved lithium battery separators including a microporous membrane laminated to a coated nonwoven, and the coating may contain a polymer and optionally, a filler or particles, and/or to methods including the steps of: unwinding the microporous membrane and the nonwoven, laminating the nonwoven and microporous membrane, and coating the nonwoven before or after lamination.

At least selected embodiments of the present invention are directed to new, improved or optimized separators, composites, batteries including same, and/or related methods. In one embodiment, a battery separator includes a microporous membrane having a nonwoven laminated thereon. The inventive battery separator can also include a microporous membrane without having a nonwoven laminated thereon. The battery separators may be used in a lithium battery or cell, a lithium ion battery, or a lithium secondary battery, battery pack, module, system, device, vehicle, or the like. In accordance with at least selected embodiments, the present disclosure or invention is directed to novel or improved battery separators, laminated separators, composite separators, coated laminated separators, coated composite separators, lithium battery separators, and/or methods of making such separators, and/or methods of using such separators or batteries including such separators. In accordance with at least certain embodiments, the present disclosure or invention is directed to novel or improved lithium battery separators including a microporous membrane laminated to a coated nonwoven, the coating may contain a polymer and optionally, a filler or particles, and/or to methods including the steps of: unwinding the microporous membrane and the nonwoven, laminating the nonwoven and microporous membrane, and coating the nonwoven before or after lamination.

In at least one embodiment, the inventive separator may result in an improved battery separator by, among other things, improving the puncture strength, reducing splittiness (e.g., increase cross machine strength), improving high temperature melt integrity, improving tensile strengths (in both the machine and cross machine directions), and/or having a shutdown function.

In FIG. 1, there is shown a first exemplary embodiment of the invention as a separator 8 that includes a coating layer 10 adhered to the surface of a nonwoven 12 which is thermally laminated forming an interfacial bond 15, to a microporous membrane 14. In this embodiment, the coating layer 10 is adhered to the surface of nonwoven material or layer 12. This coating can be fully or partially impregnated into the nonwoven 12.

Figure 2:
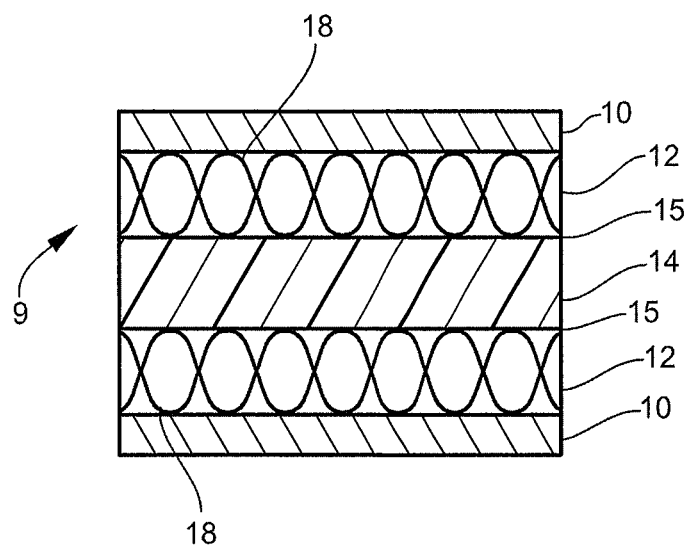
FIG. 2 is a schematic illustration of a cross-section of another embodiment of the instant invention which is a two sided lamination of components (nonwovens and membrane).

In FIG. 2, there is shown a second exemplary embodiment of the invention as a separator 9 that includes respective coating layers 10 adhered to the surface of respective nonwoven layers 12 which are thermally laminated to respective sides of a microporous membrane 14, forming interfacial bonds 15.

Figure 3:
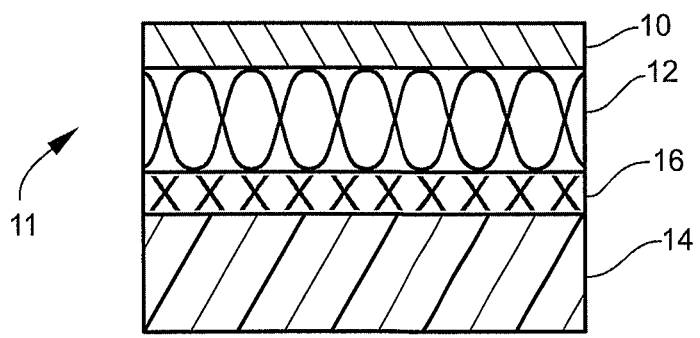
FIG. 3 is a schematic illustration of a cross-section of another embodiment of the instant invention involving one-side coated layers or components.

In FIG. 3, there is shown a third exemplary embodiment of the invention as a separator 11 that includes a coating layer 10 adhered to the surface of nonwoven 12 which is laminated or bonded to one side of a coating layer 16 adhered to the surface of a microporous membrane 14.

Figure 4:
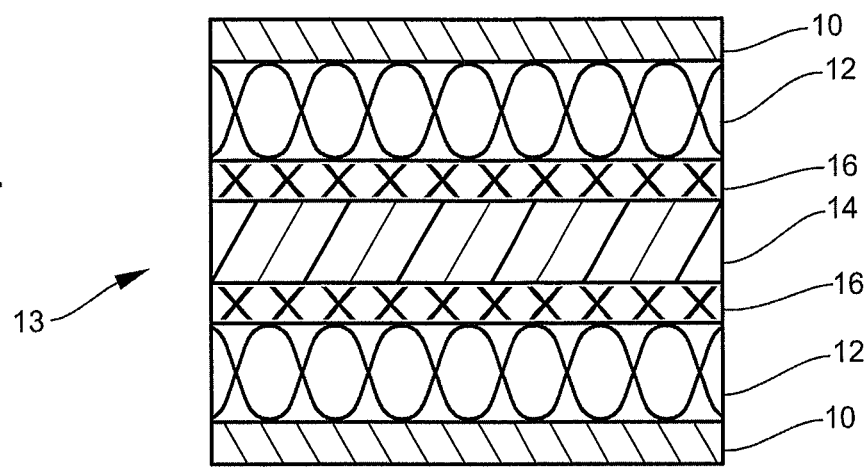
FIG. 4 is a schematic illustration of a cross-section of another embodiment of the instant invention involving two-sided coated layers or components.

In FIG. 4, there is shown a fourth exemplary embodiment of the invention as a separator 13 that includes respective coating layers 10 adhered to the surface of respective nonwovens 12 which are laminated to respective coating layers 16 on both sides or surfaces of a microporous membrane 14.

Figure 5:
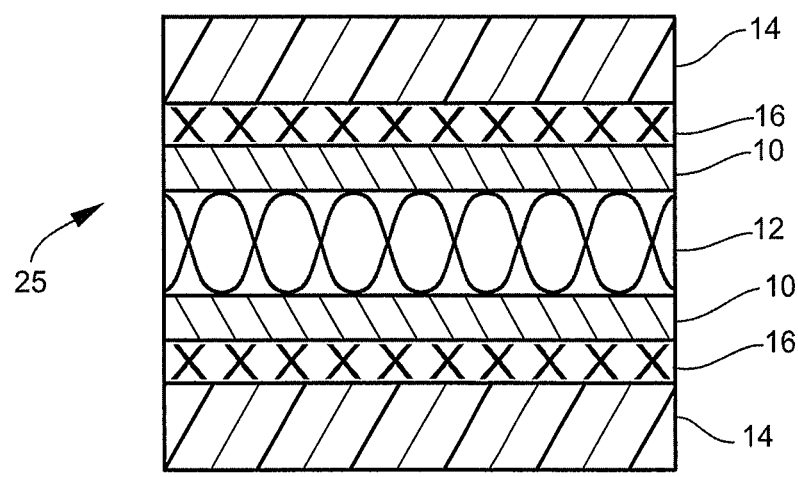
FIG. 5 is a schematic illustration of a cross-section of another embodiment of the instant invention involving two-sided membranes and coatings.

In FIG. 5, there is shown a fifth exemplary embodiment of the invention as a separator 25 that includes respective coating layers 10 adhered to both surfaces of a nonwoven 12 and which are double side laminated to respective microporous membranes 14 each having a respective coating layer 16 adhered to a respective side or surface of a respective microporous membrane 14.

The nonwoven component, material or layer 12 may be made of natural, synthetic, polymeric, and/or glass fibers. In one embodiment, the fiber polymer may be selected from the group of: polyolefin, polyester, fluoro-polymer, e.g., PVDF, polyamide (e.g., nylon), polyaramid (KEVLAR, NOMEX), acrylic, PVC, or other polymers. In another embodiment, the polyester may be selected from the group consisting of polyethylene terephthalate (PET), polybutylene terephthalate (PBT), polyethylene naphthalate (PEN), polytrimethylene terephthalate (PTT), co-polymers of the foregoing, and blends of the foregoing.

The nonwoven 12 may be a carded nonwoven, a needle-punched nonwoven, an air-laid nonwoven, a wet-laid nonwoven, a spunlaced (hydroentangled) nonwoven, a spunbonded nonwoven, a melt-spun nonwoven, an electro-spun nonwoven, an electro-blown nonwoven, a meltblown nonwoven, and combinations thereof. The nonwoven may be made of staple fibers, and/or continuous filaments. In one embodiment, the nonwoven may have a thickness of less than 1 mil (25.4 microns). In another embodiment, the nonwoven may have a thickness of less than 0.5 mil (12.7 microns). In yet another embodiment, the nonwoven may have a thickness of less than 0.2 mil (5 microns).

The fibers comprising the nonwoven 12 may have a diameter less than about 10 microns. In another embodiment, the diameter of the fibers may be less than about 1 micron. In another embodiment, the diameter of the fibers may be less than about 0.1 microns. In another embodiment, the diameter of the fibers may be less than about 0.01 microns. In another embodiment, the diameter of the fibers may be less than about 0.001 microns.

The membrane 14 and/or nonwoven 12 may further include one or more coatings 10 and/or 16. The coating 10 or 16 may cover the surface of the nonwoven or the coating may cover the surface of the nonwoven and partially, or to a large degree, impregnate into the open or porous structure of the nonwoven. The coating may partially cover or completely cover the surface of the nonwoven fibers comprising the nonwoven.

The coating 10 or 16 may be made of a natural, synthetic or polymeric material and in one embodiment, be selected from the polymer group consisting of polyethylene, polypropylene, PET, polyvinylidene fluoride (PVDF), polytetrafluoroethylene (PTFE), polyvinylidene chloride, acrylic, polychloride (PVC), polyacrylonitrile (PAN), polymethyl-methacrylate (PMMA), polyamide, styrenebutadiene copolymer, ethylene styrene copolymer, styrene-isoprene copolymers, ethylene-acrylic acid copolymer, polydiene, polyalkane polyvinyl ketone, polyvinyl halide, polyvinyl nitrile, polyvinyl ester, polystyrene, polyphenylene, polyoxide, polycarbonate, polyester, polyanhydride, polyurethane, polysulfonate, polysulfide, polysulfone, co-polymers thereof, and blends containing the foregoing. In another embodiment, the polymeric material may be selected from the group consisting of polyvinylidene fluoride (PVDF), co-polymers thereof, and blends containing the foregoing. In yet another embodiment, one particularly useful polymer is the polyvinylidene fluoride (PVDF)-hexafluoropropylene (PVDF:HFP) co-polymer and/or polyvinylchloride and mixtures thereof.

The coating 10 or 16 may include natural, synthetic, polymer, glass, or ceramic filler or particles. The filler may be blended into the coating before application to the nonwoven.

The filler may be an inert, thermally stable particle. The filler may be a ceramic particle selected from the group consisting of silicon dioxide ($SiO_2$), aluminum oxide ($Al_2O_3$), calcium carbonate ($CaCO_3$), titanium dioxide ($TiO_2$), $SiS_2$, $SiPO_4$, or glass and mixtures thereof. In another embodiment, the filler may be a ceramic particle selected from the group consisting of silicon dioxide ($SiO_2$), aluminum oxide ($Al_2O_3$), calcium carbonate ($CaCO_3$), titanium dioxide ($TiO_2$), and mixtures thereof. In yet another embodiment, the filler may be a ceramic particle selected from the group consisting of silicon dioxide ($SiO_2$), aluminum oxide ($Al_2O_3$), calcium carbonate ($CaCO_3$), and mixtures thereof.

The filler may have an average particle size in the range of about 0.001 micron to about 2 microns. In another embodiment, the average particle size of the filler may be in a range of about 0.01 micron to 2 microns. U.S. Pat. No. 6,432,586, which is incorporated herein by reference in its entirety, discloses various ceramic-coated separators. Additionally, U.S. Patent Publication No. 2014/0045033, which is also incorporated herein by reference in its entirety, discloses various ceramic particle-containing polymeric coatings for microporous battery separator membranes.

Ceramic coatings may include one or more polymeric binders, one or more types of inorganic ceramic particles and a water based (aqueous) or a non-aqueous solvent. Such coatings may be applied using various technologies such as, but not limited to, dip coating, knife, gravure, curtain, spray, etc. Furthermore, various known ceramic particle-containing polymeric coatings may be applied at varying thicknesses, such as a thickness of, for example, 2 to 6 microns onto one or both sides of a microporous battery separator, nonwoven layer, separator membrane, or combinations thereof.

Figure 6:
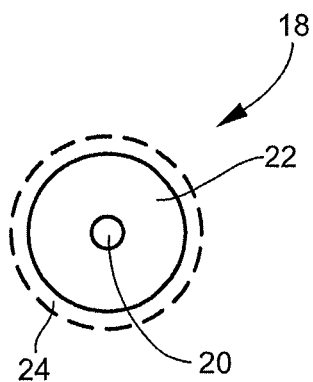
FIG. 6 is a cross-sectional view of a fiber taken generally along section lines 6-6 in FIG. 1.
Figure 7:
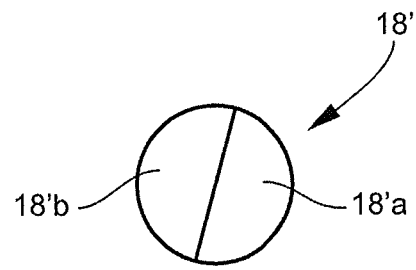
FIG. 7 is a cross-sectional view of a side-by-side bicomponent fiber.
Figure 8:
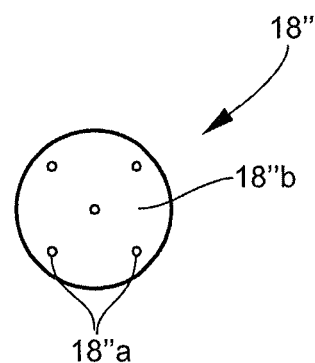
FIG. 8 is a cross-sectional view of an island-in-the-sea bicomponent fiber.
Figure 9:
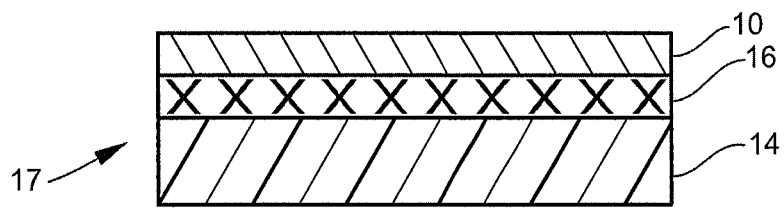
FIG. 9 is a schematic illustration of a cross-section of another embodiment of the instant invention involving a one-side coated membrane.
Figure 10:
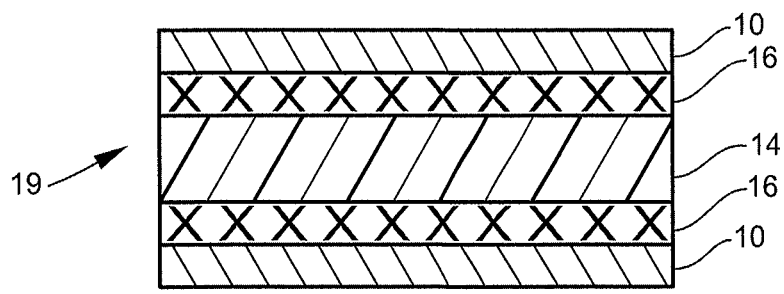
FIG. 10 is a schematic illustration of a cross-section of another embodiment of the instant invention involving a two-sided coated membrane.
Figure 11:
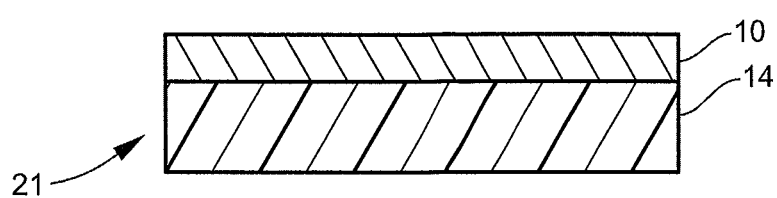
FIG. 11 is a schematic illustration of a cross-section of another embodiment of the instant invention involving a one-side coated membrane.
Figure 12:
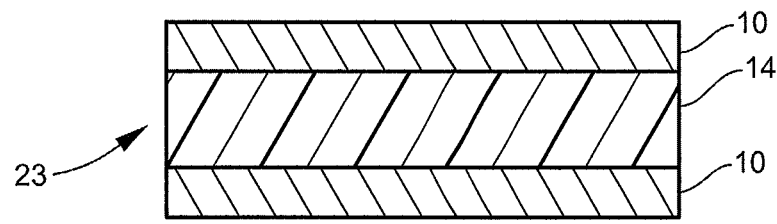
FIG. 12 is a schematic illustration of a cross-section of another embodiment of the instant invention involving a two-sided coated membrane.

The nonwoven component, material or layer 12 may be made of bicomponent (hetero-fil) fibers or non-bicomponent fibers. The bicomponent fiber may be selected from the group consisting of sheath-core fibers 18 (see FIG. 6-core 20 and sheath 22), side-by-side fibers 18' (see FIG. 7-one side 18'*a* and the other side 18'*b*), island-in-the-sea fibers 18" (see FIG. 8-islands 18"*a* and sea 18"*b*) and combinations thereof. The bicomponent fiber may have a low melt temperature component and a high melt temperature component. The low melt component may have a melt temperature less than the high melt temperature component. In one embodiment, the low melt temperature component may be a polyolefin. In one embodiment, the polyolefin may be selected from the group consisting of: polyethylene (PE), polypropylene (PP), polymethylpentene (PMP), polybutene (PB), co-polymers of the foregoing, and blends of the foregoing. The high melt temperature component may be selected from the group consisting of: polyvinylidene fluoride (PVDF), polytetrafluoroethylene (PTFE), polyvinylidene chloride, acrylic, polychloride (PVC), polyacrylonitrile (PAN), polymethylmethacrylate (PMMA), polyamide, styrenebutadiene copolymer, ethylene styrene copolymer, styrene-isoprene copolymers, ethylene-acrylic acid copolymer, polydiene, polyalkane polyvinyl ketone, polyvinyl halide, polyvinyl nitrile, polyvinyl ester, polystyrene, polyphenylene, polyoxide, polycarbonate, polyester, polyanhydride, polyurethane, polysulfonate, polysulfide, polysulfone, co-polymers thereof, and blends containing the foregoing. In another embodiment, the bicomponent fiber may have a polyolefin sheath and a core being made of a polymer selected from the group consisting of: polyester, polyamide (eg, nylon), fluoro polymer (eg TEFLON), aramid (KEVLAR, NOMEX), liquid crystal polymer (VECTRAN), polybenzimidazole (PBI), polybenzobisoxazole (PBO). In yet another embodiment, the bicomponent fiber may have a polyethylene sheath and a core being made of a polymer selected from the group consisting of: polyester, polyamide (eg, nylon), fluoro polymer (eg TEFLON), aramid (KEVLAR, NOMEX), liquid crystal polymer (VECTRAN), polybenzimidazole (PBI), polybenzobisoxazole (PBC)). In yet another embodiment, the bicomponent fiber may have a polyolefin sheath and a polyester core. In yet another embodiment, the bicomponent fiber may have a polyethylene sheath and a polyethylene terephthalate (PET) core.

The separators or separator components or membranes 8, 9, 11, 13, and 25 in FIGS. 1, 2, 3, 4, and 5, respectively, may be microporous and may have a porosity in the range of about 20-95%.

The microporous membrane or layer 14 may have an average pore size in the range of about 0.02 to about 2 microns. The microporous membrane 14 may have an average pore size in the range of about 0.04 to about 0.5 micron.

The additional exemplary embodiments of the invention depicted in FIGS. 9, 10, 11, and 12 may not contain a nonwoven layer or component 12 but may include one or more coatings 10 and/or 16 on one or both sides of a membrane 14. The membrane 14 and/or the coatings 10 and/or 16 may include one or more fibers, fillers or particles. The filler may be blended into the coating before application to the microporous membrane 14. The filler may be an inert, thermally stable fiber or particle. The filler may be a ceramic particle selected from the group consisting of silicon dioxide ($SiO_2$), aluminum oxide ($Al_2O_3$), calcium carbonate ($CaCO_3$), titanium dioxide ($TiO_2$), $SiS_2$, $SiPO_4$, or glass and mixtures thereof. In another embodiment, the filler may be a ceramic particle selected from the group consisting of silicon dioxide ($SiO_2$), aluminum oxide ($Al_2O_3$), calcium carbonate ($CaCO_3$), titanium dioxide ($TiO_2$), and mixtures thereof. In yet another embodiment, the filler may be a ceramic particle selected from the group consisting of silicon dioxide ($SiO_2$), aluminum oxide ($Al_2O_3$), calcium carbonate ($CaCO_3$), and mixtures thereof.

The filler may have an average particle size in the range of about 0.001 micron to about 2 microns. In another embodiment, the average particle size of the filler may be in a range of about 0.01 micron to about 2 microns.

The microporous membrane 14 may have an ASTM Gurley Number in the range of about 37 to 150 sec. The microporous membrane may have a Gurley Number in the range of about 30 to 80 sec. ASTM Gurley Number refers to the time it takes for 10 cc of air at 12.2 inches of water to pass through one square inch of membrane.

The microporous membrane 14 may have any number of plies. In some embodiments, the microporous membrane has a single ply. In the case of a single ply, the single ply may be made of a polyolefin. The polyolefin may be selected from the group consisting of: polyethylene (PE), polypropylene (PP), polymethylpetene (PMP), polybutene (PB), co-polymers of the foregoing, and blends of the foregoing. In another embodiment, the polyolefin may be selected from the group consisting of: polyethylene (PE), polypropylene (PP), co-polymers of the foregoing, and blends of the foregoing. In yet another embodiment, the polyolefin may be selected from the group consisting of: polyethylene (PE), co-polymers of the foregoing, and blends of the foregoing. In yet another embodiment, the polyolefin of the single ply may be polyethylene (PE).

The microporous membrane 14 may have multiple plies. For example, the microporous membrane may have two plies. In this case, each ply may be made of a different polymer. One ply may be made of a polyolefin. The polyolefin may be selected from the group consisting of: polyethylene (PE), polypropylene (PP), polymethylpetene (PMP), polybutene (PB), co-polymers of the foregoing, and blends of the foregoing. In another embodiment, the polyolefin may be selected from the group consisting of: polyethylene (PE), co-polymers of the foregoing, and blends of the foregoing. In yet another embodiment, the polyolefin may be polyethylene (PE). The other ply may be made of a polyolefin. The polyolefin may be selected from the group consisting of: polyethylene (PE), polypropylene (PP), polymethylpetene (PMP), polybutene (PB), co-polymers of the foregoing, and blends of the foregoing. In another embodiment, the polyolefin may be selected from the group consisting of: polypropylene (PP), co-polymers of the foregoing, and blends of the foregoing. In yet another embodiment, the polyolefin may be polypropylene (PP). In yet another embodiment, one ply may be made of a polyethylene-based polymer and the other ply may be made of a polypropylene-based polymer.

The microporous membrane may have three or more plies. At least one ply may be made of a different polymer. And, at least two plys may be made of a same polymer. The outer plies may be made of the same polymer and the inner ply may be made of a different polymer. The same polymer may be a polyolefin. The polyolefin may be selected from the group consisting of: polyethylene (PE), polypropylene (PP), polymethylpetene (PMP), polybutene (PB), co-polymers of the foregoing, and blends of the foregoing. In another embodiment, the polyolefin may be selected from the group consisting of: polypropylene (PP), co-polymers of the foregoing, and blends of the foregoing. In yet another embodiment, the polyolefin being polypropylene (PP). The different polymer may be a polyolefin. The polyolefin may be selected from the group consisting of: polyethylene (PE), polypropylene (PP), polymethylpentene (PMP), polybutene (PB), co-polymers of the foregoing, and blends of the foregoing. In another embodiment, the polyolefin may be selected from the group consisting of: polyethylene (PE), co-polymers of the foregoing, and blends of the foregoing. In yet another embodiment, the polyolefin may be polyethylene (PE). The plies may be layered as polypropylene (PP)/polyethylene (PE)/polypropylene (PP) or polyethylene (PE)/polypropylene (PP)/polyethylene (PE).

Figure 13:
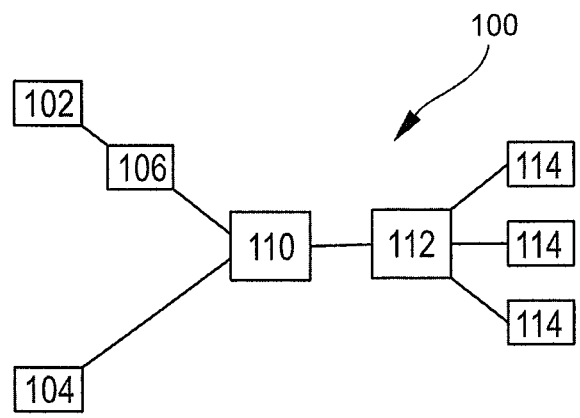
FIG. 13 is a schematic illustration of an embodiment of a method for making a single or double side laminated coated battery separator.

An exemplary first method of making the laminated or bonded embodiment of the battery separator is illustrated in FIG. 13. Lamination provides the following benefits to the manufacture of the separator: uniformity or thickness, adhesion of the nonwoven to the microporous membrane, condensement of the nonwoven and microporous membrane and the creation of the interfacial layer 15 (see FIGS. 1 and 2).

In FIG. 13, the first exemplary embodiment of the method to make separator 8 shows a method 100 of making a laminated battery separator may include the steps of: 1) unwinding a nonwoven 102, 2) unwinding a microporous membrane 104, 3) coating the nonwoven with a coating material 106, and 4) laminating the coated nonwoven to the microporous membrane 104 to form a composite or laminate 110. Additionally, the method may include the optional steps of forming a roll of laminated separator 112 and slitting the laminated separator 112 into narrower widths, and winding the slits or slit separators 114.

With reference again to FIG. 13, a second exemplary embodiment of a method to make a laminated battery separator may include the steps of: 1) unwinding a first and second nonwoven 102, 2) unwinding a microporous membrane 104, 3) coating the nonwovens with a coating material 106, and 4) laminating a respective coated nonwoven to each side of the microporous membrane 104 to form a laminate 110 to make separator 9.

Laminating may be performed by calendering. Calendering is performed by passing the nonwoven and the microporous membrane through the nip of two rolls or rollers such as two heated rollers, where heat and pressure are applied so that the adjacent surfaces (polymers) of the nonwoven and microporous membrane are fused at the interfacial bond 15 of FIGS. 1 and 2. Additionally, the method may include the optional steps of slitting the laminated separator 112 into narrower widths, and winding the slit separators 114. The coating material may contain a filler or particles. The coating may be applied by spraying, dipping, contact coating, gravure-type coating and/or brushing. The coating or coatings may be applied to one or both sides of the nonwoven, or to the side on the microporous membrane that contacts the nonwoven, or on both sides of the microporous membrane, or to one or both sides of the nonwoven and/or membrane.

Figure 14:
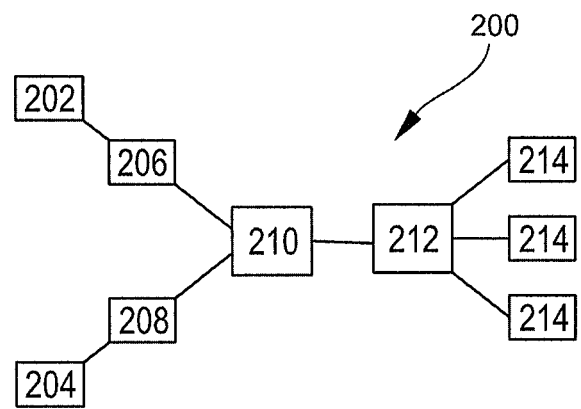
FIG. 14 is a schematic illustration of another embodiment of a method for making a single or double side laminated coated battery separator.

In FIG. 14, another exemplary embodiment of the method to make a coated, laminated battery separator is illustrated. This method 200 includes the steps of: 1) unwinding a microporous membrane 204, 2) unwinding a nonwoven material 202, 3) coating the nonwoven 202 with coating material 206, 4) coating microporous membrane 204 with a coating material 208, 5) laminating coated microporous membrane 204 and coated nonwoven 202 to make laminated or bonded component or laminate 210 which can be separator or membrane 11 (see FIG. 3). Additionally, respective nonwovens 202 coated with 206 can be laminated to both sides of microporous membrane 204 coated with 208 to make laminated membrane 210 which can be separator or membrane 13 (see FIG. 4). Additionally, nonwoven 202 coated on both sides with coating 206 can be laminated on both sides to respective coated membranes 204,208 to make laminated membrane 210 which can be separator or membrane 25 (see FIG. 5). The coatings may be applied by spraying, dipping, contact coating, gravure-type coating and/or brushing. Additionally, the method may include the optional steps of slitting the coated separator 212 into narrower widths, and winding the slit separators 214.

Figure 15:
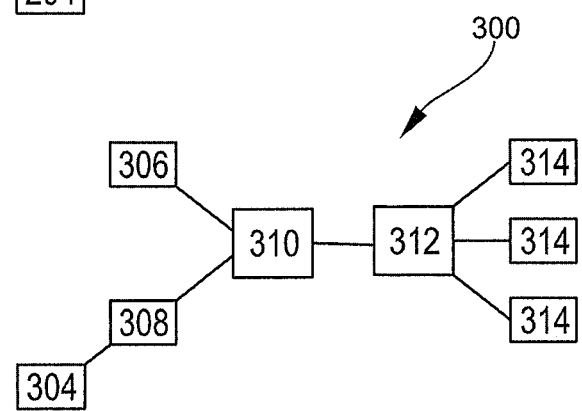
FIG. 15 is a schematic illustration of another embodiment of a method for making a single or double side coated battery separator.

In FIG. 15, another exemplary embodiment of the method to make a coated battery separator is illustrated. This method 300 includes the steps of: 1) unwinding a microporous membrane 304, 2) coating microporous membrane 304 with a coating material 308, 3) coating coated material 304 with coating 306 to make coated membrane 310 which can be separator or membrane 17. (See FIG. 9). Additionally, membrane 304 can be coated on both sides with coating 308 and then coated with coating material 306 to make coated membrane 310 which can be separator or membrane 19. (See FIG. 10). The coatings may be applied by spraying, dipping, contact coating, gravure-type coating, and/or brushing. Additionally, the method may include the optional steps of slitting the coated material or separator 312 into narrower widths, and winding the slit separators 314.

Figure 16:
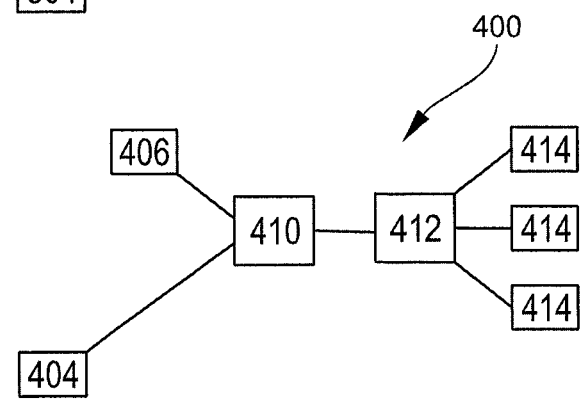
FIG. 16 is a schematic illustration of another embodiment of a method for making a single or double side coated battery separator.

In FIG. 16, another exemplary embodiment of the method to make a coated battery separator is illustrated. This method 400 includes the steps of: 1) unwinding a microporous membrane 404, 2) coating microporous membrane 404 with a coating material 406 to make coated membrane 410 which can be separator or membrane 21. (See FIG. 11) Additionally, membrane 404 can be coated on both sides with coating 406 to make coated membrane 410 which can be separator or membrane 23. (See FIG. 12) The coatings may be applied by spraying, dipping, contact coating, gravure-type coating and/or brushing. Additionally, the method may include the optional steps of slitting the coated separator 412 into narrower widths, and winding the slit separators 414.

Battery separators and methods are disclosed. The battery separator may be used in a lithium battery. The separator may include a microporous membrane laminated to a coated nonwoven. The coating may contain a polymer and optionally, a filler or particles. The methods may include the steps of: unwinding the microporous membrane and the nonwoven, laminating the nonwoven and microporous membrane, and coating the nonwoven before and/or after lamination.

At least selected embodiments, aspects or objects of the present disclosure or invention are directed to and/or may provide new, improved or optimized separators, composites, batteries including same, and/or related methods. In at least one embodiment, a battery separator includes a microporous membrane having a nonwoven laminated thereon. The inventive battery separator can also include a microporous membrane without having a nonwoven laminated thereon. The battery separators may be used in a lithium battery or cell, a lithium ion battery, or a lithium secondary battery, battery pack, module, system, device, vehicle, and/or the like. In accordance with at least certain embodiments, the present disclosure or invention is directed to novel or improved battery separators, laminated separators, composite separators, coated laminated separators, coated composite separators, lithium battery separators, and/or methods of making such separators, and/or methods of using such separators or batteries including such separators. In accordance with at least certain selected embodiments, the present disclosure or invention is directed to novel or improved lithium battery separators including a microporous membrane laminated to a coated nonwoven, and the coating may contain a polymer and optionally, a filler or particles, and/or to methods including the steps of: unwinding the microporous membrane and the nonwoven, laminating the nonwoven and microporous membrane, and coating the nonwoven before or after lamination.

At least selected embodiments, aspects or objects of the present disclosure or invention are directed to and/or may provide new, improved or optimized separators, composites, batteries including same, and/or related methods, including, for example, a battery separator comprising:

a microporous membrane having a nonwoven laminated thereon, and/or wherein said battery separator being a battery separator for a lithium battery, wherein said battery separator being a battery separator for a lithium ion battery, wherein said battery separator being a battery separator for a lithium secondary battery, and/or wherein said nonwoven being made polymeric fibers, and the polymer being selected from the group of: polyolefin, polyester, fluoro-polymer, e.g., PVDF, poly-amide (eg, nylon), polyaramid (KEVLAR, NOMEX), acrylic, PVC, or other polymers, wherein said polyester being selected from the group consisting of polyethylene terephthalate (PET), polybutylene terephthalate (PBT), polyethylene naphthalate (PEN), polytrimethylene terephthalate (PTT), co-polymers of the foregoing, and blends of the foregoing, wherein said nonwoven being made of bicomponent (hetero-fil) fibers, wherein said bicomponent fiber being selected from the group consisting of sheath-core fibers, side-by-side fibers, island-in-the-sea fibers and combinations thereof, wherein said bicomponent fiber having a low melt temperature component and a high melt temperature component, where the low melt component having a melt temperature less than the high melt temperature component, wherein said low melt temperature component being a polyolefin, wherein the polyolefin being selected from the group consisting of: polyethylene (PE), polypropylene (PP), polymethylpetene (PMP), polybutene (PB), co-polymers of the foregoing, and blends of the foregoing, wherein said high melt temperature component being selected from the group consisting of: polyester, polyamide (eg, nylon), fluoro polymer (eg TEFLON), aramid (eg, KEVLAR, NOMEX), liquid crystal polymer (VECTRAN), polybenzimidazole (PBI), polybenzobisoxazole (PBO), wherein said bicomponent fiber having a polyolefin sheath and a core being made of a polymer selected from the group consisting of: polyester, polyamide (eg, nylon), fluoro polymer (eg TEFLON), aramid (KEVLAR, NOMEX), liquid crystal polymer (VECTRAN), polybenzimidazole (PBI), polybenzobisoxazole (PBO), wherein said bicomponent fiber having a polyethylene sheath and a core being made of a polymer selected from the group consisting of: polyester, polyamide (eg, nylon), fluoro polymer (eg TEFLON), aramid (KEVLAR, NOMEX), liquid crystal polymer (VECTRAN), polybenzimidazole (PBI), polybenzobisoxazole (PBO), wherein said bicomponent fiber having a polyolefin sheath and a polyester core, wherein said bicomponent fiber having a polyethylene sheath and a polyethylene terephthalate (PET) core, wherein said nonwoven being a carded nonwoven, a needle-punched nonwoven, an air-laid nonwoven, a wet-laid nonwoven, a spunlaced (hydroentangled) nonwoven, a spunbonded nonwoven, a melt-spun nonwoven, an electro-spun nonwoven, and combinations thereof, wherein said nonwoven being made of staple fibers, and/or continuous filaments, wherein said nonwoven having a thickness of less than 1 mil (25.4 microns), wherein said nonwoven having a thickness of less than 0.5 mil (12.7 microns), wherein said nonwoven having a thickness of less than 0.25 mil (6.4 microns), and/or wherein said nonwoven further comprising a coating, wherein said coating covering a fiber surface of the nonwoven, wherein said coating partially or fully covering a fiber surface of the nonwoven, wherein said coating covering a surface of the nonwoven, wherein said coating partially covering a surface of the nonwoven, wherein said coating fully impregnates into the interior voids of the nonwoven, wherein said coating be made of a ferroelectric polymer, wherein said ferroelectric polymer being selected from the group consisting of polyethylene oxide (PEO), polytetrafluoroethylene (PTFE), polyurethane (PU), polyacrylonitrile (PAN), polymethylmethacrylate (PMMA), polytetraethylene glycol diacrylate, polyvinylidene fluoride (PVDF), co-polymers thereof, and blends containing the foregoing, wherein said ferroelectric polymer being selected from the group consisting of polyvinylidene fluoride (PVDF), co-polymers thereof, and blends containing the foregoing, wherein said polyvinylidene fluoride (PVDF) co-polymer being selected from the group consisting of polyvinylidene fluoride:hexafluoropropylene (PVDF:HFP) and polyvinylidene fluoride:chlorotrifluoroethylene (PVDF:CTFE), wherein said coating further including filler, wherein said filler being blended into the coating before application to said nonwoven, wherein said filler being added onto the coating after application of the coating onto said nonwoven, wherein said filler being an inert, thermally stable particle, wherein said filler being a ceramic particle selected from the group consisting of silicon dioxide ($SiO_2$), aluminum oxide ($Al_2O_3$), calcium carbonate ($CaCO_3$), titanium dioxide ($TiO_2$), $SiS_2$, $SiPO_4$ and mixtures thereof, wherein said filler being a ceramic particle selected from the group consisting of silicon dioxide ($SiO_2$), aluminum oxide ($Al_2O_3$), calcium carbonate ($CaCO_3$), titanium dioxide ($TiO_2$), and mixtures thereof, wherein said filler being a ceramic particle selected from the group consisting of silicon dioxide ($SiO_2$), aluminum oxide ($Al_2O_3$), calcium carbonate ($CaCO_3$), and mixtures thereof, wherein said filler having an average particle size in the range of 0.001 micron to 25 microns, most preferably in the range of 0.01 micron to 2 microns, wherein said filler having an average particle size in the range of 0.01 micron to 2 microns, and/or wherein said microporous membrane has a porosity in the range of about 20-80%, wherein said microporous membrane has a porosity in the range of about 28-60%, wherein said microporous membrane has an average pore size in the range of about 0.02 to 2 microns, wherein said microporous membrane has an average pore size in the range of about 0.08 to 0.5 micron, wherein said microporous membrane has a Gurley Number in the range of about 15 to 150 sec, wherein said microporous membrane has a Gurley Number in the range of about 30 to 80 sec, wherein said microporous membrane has a single ply, wherein said single ply being made of a polyolefin, wherein said polyolefin being selected from the group consisting of: polyethylene (PE), polypropylene (PP), polymethylpetene (PMP), polybutene (PB), co-polymers of the foregoing, and blends of the foregoing, wherein said polyolefin being selected from the group consisting of: polyethylene (PE), polypropylene (PP), co-polymers of the foregoing, and blends of the foregoing, wherein said polyolefin being selected from the group consisting of: polyethylene (PE), co-polymers of, the foregoing, and blends of the foregoing, wherein said polyolefin being polyethylene (PE), wherein said microporous membrane has multiple plies, wherein said microporous membrane has two plies, wherein each ply being made of a different polymer, wherein one ply being made of a polyolefin, wherein said polyolefin being selected from the group consisting of: polyethylene (PE), polypropylene (PP), polymethylpetene (PMP), polybutene (PB),co-polymers of the foregoing, and blends of the foregoing, wherein said polyolefin being selected from the group consisting of: polyethylene (PE), co-polymers of the foregoing, and blends of the foregoing, wherein said polyolefin being polyethylene (PE), wherein another ply being made of a polyolefin, wherein said polyolefin being selected from the group consisting of: polyethylene (PE), polypropylene (PP), polymethylpetene (PMP), polybutene (PB),co-polymers of the foregoing, and blends of the foregoing, wherein said polyolefin being selected from the group consisting of: polypropylene (PP), co-polymers of the foregoing, and blends of the foregoing, wherein said polyolefin being polypropylene (PP), wherein one ply being made of a polyethylene-based polymer and another ply being made of a polypropylene-based polymer, wherein said microporous membrane has three plies, wherein at least two ply being made of a different polymer, wherein at least two ply being made of a same polymer, wherein the outer plies being made of the same polymer and the inner ply being made of a different polymer, wherein the same polymer being a polyolefin, wherein said polyolefin being selected from the group consisting of: polyethylene (PE), polypropylene (PP), polymethylpetene (PMP), polybutene (PB),co-polymers of the foregoing, and blends of the foregoing, wherein said polyolefin being selected from the group consisting of: polypropylene (PP), co-polymers of the foregoing, and blends of the foregoing, wherein said polyolefin being polypropylene (PP), wherein the different polymer being a polyolefin, wherein said polyolefin being selected from the group consisting of: polyethylene (PE), polypropylene (PP), polymethylpetene (PMP), polybutene (PB),co-polymers of the foregoing, and blends of the foregoing, wherein said polyolefin being selected from the group consisting of: polyethylene (PE), co-polymers of the foregoing, and blends of the foregoing, wherein said polyolefin being polyethylene (PE), and/or wherein said plies are layered as polypropylene (PP)/polyethylene (PE)/polypropylene (PP); and/or a method of making a laminated battery separator comprising the steps of:

unwinding a nonwoven, unwinding a microporous membrane, coating the nonwoven with a coating material, and laminating the coated nonwoven to the microporous membrane, and/or wherein the coating material containing a ferroelectric material, wherein the coating material containing a ferroelectric material and a filler, and/or wherein coating being spraying, dipping, contact coating, and/or brushing the coating material thereon; and/or a method of making a laminated battery separator comprising the steps of:

unwinding a nonwoven, unwinding a microporous membrane, laminating the nonwoven to the microporous membrane, and coating the nonwoven with a coating material, and/or wherein the coating material containing a ferroelectric material, wherein the coating material containing a ferroelectric material and a filler, and/or wherein coating being spraying, dipping, contact coating, and/or brushing the coating material thereon; and/or a battery separator, battery, and/or method as shown, disclosed and/or described herein.

Battery separators and methods are disclosed. The battery separator may be used in a lithium battery. The separator may include a microporous membrane laminated to a coated nonwoven. The coating may contain a polymer and optionally, a filler or particles. The methods may include the steps of: unwinding the microporous membrane and the nonwoven, laminating the nonwoven and microporous membrane, and coating the nonwoven before and/or after lamination.

The present invention may be embodied in other forms without departing from the spirit and the essential attributes thereof, and, accordingly, reference should be made to the appended claims, rather than to the foregoing specification, as indicated the scope of the invention.

We claim:

1. A battery separator for a lithium battery comprising:

at least one microporous polyolefinic membrane, at least one nonwoven layer on at least one side of said microporous membrane, said nonwoven layer being bonded to said microporous membrane, wherein said nonwoven layer including comprises (1) at least one ferroelectric polymer selected from the group consisting of polyethylene oxide (PEO), polyacrylonitrile (PAN), polytetraethylene glycol diacrylate, and blends containing the foregoing, and (2) polymeric fibers selected from the group of: polytrimethylene terephthalate (PTT) fibers, PTT co-polymer fibers, and blends thereof, wherein said microporous membrane has a porosity in the range of about 20-80%, wherein said microporous membrane has an average pore size in the range of about 0.02 to 2 microns, wherein said microporous membrane has a Gurley Number in the range of about 15 to 150 sec.

2. The battery separator of claim 1 wherein said battery separator being a battery separator for a secondary lithium battery, a lithium ion battery, or a lithium polymer battery.

3. The battery separator of claim 1, wherein said nonwoven having a thickness of less than 0.5 mil (12.7 microns).

4. The battery separator of claim 1, wherein said nonwoven having a thickness of less than 0.25 mil (6.4 microns).

5. The battery separator of claim 1, wherein said microporous membrane has a porosity in the range of about 28-60%.

6. The battery separator of claim 1, wherein said microporous membrane has an average pore size in the range of about 0.08 to 0.5 microns.

7. The battery separator of claim 1, wherein said microporous membrane has a Gurley Number in the range of about 30 to 80 sec.

8. The battery separator of claim 1, wherein said microporous membrane has at least two plies, each ply being made of a different polymer.

* * * * *